United States Patent [19]

Carman

[11] 4,035,241
[45] July 12, 1977

[54] METHOD AND APPARATUS FOR PURIFYING A LIQUID BY PRESSURE DISTILLATION

[76] Inventor: Vincent E. Carman, 10728 NE. Halsey D-34, Portland, Oreg. 97220

[21] Appl. No.: 656,431

[22] Filed: Feb. 9, 1976

[51] Int. Cl.² ............................................. B01D 3/10
[52] U.S. Cl. .......................... 202/205; 159/DIG. 16
[58] Field of Search ............... 202/205, 185 R, 164; 203/11, 91, 99, 1; 159/DIG. 16; 196/114; 55/43; 208/366

[56] References Cited

U.S. PATENT DOCUMENTS

| | | | |
|---|---|---|---|
| 2,716,446 | 8/1955 | Ross | 202/205 |
| 3,050,447 | 8/1962 | Olney | 203/91 |
| 3,127,330 | 3/1964 | Katz | 203/91 |
| 3,129,146 | 4/1964 | Hassler | 203/91 |
| 3,390,057 | 6/1968 | Day | 202/202 |
| 3,475,288 | 10/1969 | Ezzell | 203/1 |

Primary Examiner—Hiram H. Bernstein
Attorney, Agent, or Firm—Chernoff & Vilhauer

[57] ABSTRACT

An apparatus and method for purifying a liquid by vacuum-induced vaporization of the impure liquid into a vapor in a first enclosure and subsequent pressure-induced condensation of the vapor into a relatively pure liquid in a second enclosure. A conduit interconnecting the two enclosures includes a pressure-sensitive one-way valve for permitting automatic pressure-induced vapor flow from the first enclosure to the second enclosure while preventing vapor flow in the opposite or return direction. In a first embodiment, the alternating pressure variation necessary to produce the vaporization in the first enclosure, the vapor flow through the conduit and the condensation in the second enclosure is produced by exposing the interiors of the two enclosures to the undulating motion of the surface of an open body of wave-active liquid. In a second embodiment, the alternating pressure variations are produced by mechanical means.

8 Claims, 4 Drawing Figures

METHOD AND APPARATUS FOR PURIFYING A LIQUID BY PRESSURE DISTILLATION

BACKGROUND OF THE INVENTION

The present invention relates to an apparatus and method for purifying a liquid by vaporization and subsequent condensation. As is well known to those persons familiar with the art, any liquid may be purified by vaporization in a first enclosure and subsequent recondensation in a second enclosure. Although numerous means have been devised for accomplishing the necessary changes of state, most of the known distillation systems utilize the principal of temperature variation to produce both the vaporization and the condensation. As the liquid is heated, a relatively pure vapor is formed, leaving behind any non-volatile contaminants, for example the salt in sea water. When the vapor is cooled, it condenses back into a relatively pure liquid. The principal disadvantage of these known temperature-operated systems is the large amount of energy that is required to heat the impure liquid and then cool the vapor to produce a relatively small amount of pure liquid.

SUMMARY OF THE INVENTION

The present invention is directed to apparatus and method for purifying a liquid by pressure-induced vaporization and condensation. More particularly, the method of the present invention comprises subjecting a liquid contained within a first enclosure to a negative pressure sufficient to convert a portion of the liquid to a vapor, transferring the vapor to a second enclosure, and then subjecting the vapor within the second enclosure to a positive pressure sufficient to condense the vapor back into a liquid. In this manner, any non-volatile material contained within the impure liquid will remain in the first enclosure and only the volatile or pure components of the liquid will be transferred to the second enclosure and condensed back into their liquid form. In those instances where the liquid purifying process is to be carried out near an open body of wave-activated water, for example to desalinate sea water, the undulating motion of the body of water is used to provide the necessary pressure variation within the two enclosures. In other cases, when such naturally occurring wave action is either inadequate or absent, the necessary pressure variations are produced by mechanical means. The method of the present invention also includes continuously monitoring the quantity of liquid accumulating by condensation of the vapor in the second enclosure and automatically discharging a portion thereof when the quantity reaches a predetermined value.

The apparatus of the present invention comprises first and second upright walled enclosures, the bottoms of which may be either open or closed and the tops of which are sealingly connected to a respective end of an interconnecting conduit. A pressure-sensitive one-way valve located proximate the connection between one end of the conduit and the top of the first enclosure permits vapor flow from the first enclosure to the conduit while preventing vapor flow in the reverse or return direction. Openings are formed in the walls of the two enclosures proximate their bottoms to permit the free flow of liquid therethrough. A flexible diaphragm extends across the horizontal cross section of the second enclosure above the apertures formed through its walls to effectively divide the enclosure into upper and lower portions and to form a flexible seal therebetween, thus limiting the space into which a liquid may flow through the apertures to that portion of the enclosure below the diaphragm. The second enclosure also includes a relief valve mounted in the enclosure wall above the diaphragm and in communication therewith for automatically discharging a portion of any fluid contained within the enclosure whenever the flexible diaphragm is deformed downwardly beyond a predetermined point.

In operation, for example to desalinate sea water, the interconnected enclosures are placed in an open body of wave-actuated sea water with the bottoms of the enclosures resting upon the sea bed, the tops of the enclosures extending above the surface of the water to a height of approximately 35–40 feet, and the two enclosures spaced laterally from one another in the direction of wave motion a distance approximately equal to one half the distance between wave crests, that is, one-half wave length of the undulating wave form defining the surface of the water body. The first enclosure, which is open to the sea via the apertures formed near its bottom is then filled completely with salt water, while the upper portion of the second enclosure and the entire interconnecting conduit are filled completely with fresh water. That portion of the second enclosure extending below the flexible diaphragm and open to the water body via the apertures formed near its bottom is also filled with sea water.

After a period of time, because of the negative pressure generated within the two enclosures by the weight of the water contained therein, water vapor will begin to form within the conduit and near the tops of the two enclosures. This water vapor will continue to form until the fresh water has receded from the conduit and the water levels in the two enclosures have stabilized at about 30 feet above the surface of the sea. The actual heights of the water columns in the two enclosures will depend upon the temperature and salinity of the water and the pressure of the surrounding atmosphere.

At this point, the undulating wave motion of the surrounding sea water becomes important. With the two enclosures spaced laterally by approximately one-half wave length of the undulating wave form moving across the surface of the surrounding water body, a wave trough or depression will be present at one of the enclosures while a wave crest or peak will be present at the other. Whenever a wave trough is present at the first enclosure, the salt water column within that enclosure will be drawn downwardly by the momentary lowering of the surrounding water surface, thereby decreasing the pressure within the enclosure above the water column to a point sufficient to cause the water at the top of the column to begin to vaporize into a relatively pure water vapor. Water vapor already present within the conduit interconnecting the two enclosures is prevented from entering the first enclosure as the decreased pressure within that enclosure holds the valve in its closed position. At the same time that the wave trough is present at the first enclosure, a wave crest will be present at the second enclosure to force the fresh water column contained therein upwardly, and thereby increase the pressure in that enclosure and also in the conduit. This increased pressure within the second enclosure and the conduit will cause any water vapor contained therein to begin to condense into liquid and run down the enclosure and conduit walls to join the column of fresh water. The rising sea water will be prevented by the flexible diaphragm from entering the upper portion of the second enclosure and contaminating the fresh water column.

As the undulating wave form continues to move across the surface of the surrounding water body, the wave trough at the first enclosure will be replaced by a wave crest and the wave crest at the second enclosure will be replaced by a wave trough. The rising water level resulting from the wave crest at the first enclosure will force the salt water column contained within the enclosure to rise, thereby increasing the pressure within the enclosure and forcing any water vapor formed within the enclosure during the presence of the wave trough to be transferred from the enclosure, past the automatically opening one-way valve, and into the conduit. At the same time, the lowering water level at the second enclosure due to the presence of the wave trough will decrease the pressure in that enclosure and the conduit, facilitating the entry thereinto of the water vapor being forced from the first enclosure. As the wave form continues to move, water vapor will be produced in the first enclosure upon the passing thereby of each wave trough and forced therefrom and into the conduit upon the passing of each wave crest, while the water vapor received by the second enclosure upon the passing thereby of each wave trough will be compressed into fresh water upon the passing of each wave crest.

After a period of time, the fresh water accumulating in the second enclosure will cause the flexible diaphragm separating the fresh water from the salt water of the surrounding water body to be deformed downwardly beyond a predetermined point. At that time, the relief valve connecting the second enclosure to a discharge conduit will be activated to discharge a portion of the fresh water from the enclosure. Due to the apertures formed near the bottom of the first enclosure, the salt water column contained therein will be automatically replenished with each passing wave crest as the water vapor previously produced is expelled into the conduit. Thus, once the pressure distillation apparatus of the present invention is moved into place and filled with its initial charge of fresh and salt water, it will operate continuously and automatically solely from the energy provided by the passing waves. Also, since the positive and negative pressures present within the system at any moment are only slightly departed from atmospheric, the apparatus may be constructed of relatively lightweight and low cost materials.

In a second embodiment of the present invention, one that is adapted for use in the absence of a sufficiently deep naturally occurring hydraulic wave, the apparatus is supported above ground level and the pressure variations within the two enclosures are produced by alternately and sequentially raising and lowering containers of water surrounding the bottom of each of the enclosures. In this manner, the natural action of the undulating wave form of an open body of water is simulated and the system operates substantially as described above; the only exception being that salt water must now be periodically added to the first enclosure to replace that which is expelled as water vapor since the bottom of the enclosure is no longer open to a substantially inexhaustible supply. Conventional mechanical means are employed to raise and lower the two water containers.

It is, therefore, a principal objective of the present invention to provide a pressure distillation system for purifying a liquid using only the energy derived from the naturally occurring undulating motion of the waves moving across the surface of the sea.

It is a principal feature of the pressure distillation system of the present invention that it may also be operated by mechanical means.

It is an additional feature of the pressure distillation system of the present invention that once a predetermined quantity of liquid has been purified, it will be automatically discharged from the system.

It is a further feature of the pressure distillation system of the present invention that it may be constructed of relatively lightweight and low cost material.

The foregoing objectives, features and advantages of the present invention will be more readily understood upon consideration of the following detailed description of the invention taken in conjunction with the accompanying drawings.

DETAILED DESCRIPTION OF THE INVENTION

Figure 1:
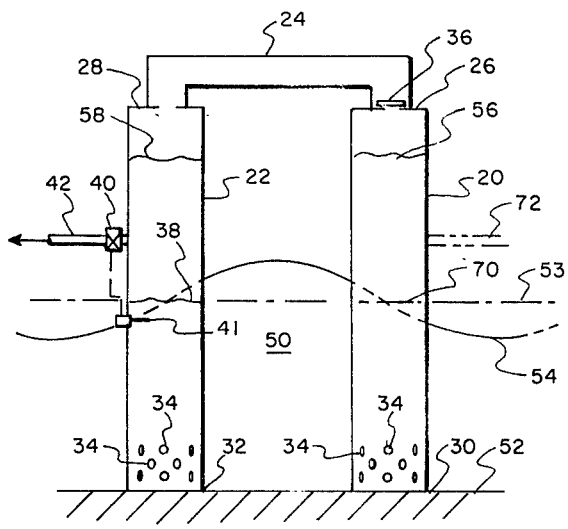
FIG. 1 is a simplified cross-sectional view of an exemplary embodiment of the pressure distillation system of the present invention partially immersed in an open body of water and under the influence of an undulating hydraulic wave.

An exemplary embodiment of the pressure distillation apparatus of the present invention is shown in FIG. 1 as comprising a first and second upright walled enclosure 20 and 22, respectively, the top 26 and 28 of which are sealingly connected to a respective end of a substantially rigid interconnecting conduit 24. The bottoms 30 and 32 of the two enclosures may be either open or closed. A plurality of openings 34, or other suitable means for providing substantially unrestricted liquid flow into and out of each enclosure, are formed in the walls of the enclosures proximate their bottoms, and a pressure-sensitive one-way valve 36 is located proximate the interconnection between the conduit 24 and the first enclosure 20 to permit vapor flow from the enclosure to the conduit whenever the pressure in the enclosure exceeds that of the conduit, and to prevent vapor flow in the opposite direction under any condition. Extending across the horizontal cross section of the second enclosure 22 at a predetermined distance from the top of the enclosure is a flexible diaphragm 38. The peripheral edge of this diaphragm is fixedly attached to the interior surface of the enclosure such that a pressure difference developed across the diaphragm will force the central portion of the diaphragm to deform upwardly or downwardly. A relief valve 40 connecting the interior of the enclosure 22 to a discharge conduit 42 attached to the side of the enclosure is coupled to the diaphragm 38, for example by means of a limit switch 40 mounted below the diaphragm, or other suitable means, such that a downward deformation of the central portion of the diaphragm beyond a predetermined distance will cause the relief valve to open. For any other position of the diaphragm, the relief valve 40 will remain closed.

For operation as a wave-powered pressure distillation system to desalinate sea water, the entire interconnected apparatus is erected, as shown in FIG. 1, oven an open body of wave-activated sea water 50 with the bottoms 30 and 32 of the two enclosures 20 and 22 resting on the underwater bed 52 and the tops 26 and 28 of the enclosures extending approximately 35–40 feet above the average level 53 of the undulating wave form 54 defining the surface of the body of water. For ease of visualization, the surface wave form 54 is shown in FIG. 1 as a simple sinusoidal wave. Note that the two enclosures 20 and 22 are spaced approximately one-half wave length apart in the direction of wave movement. For ease of initial explanation, the wave form is shown producing equal water levels at the sites of both enclosures. Although the actual height and lateral spacing of the two enclosures will vary depending upon the depth of the water body over which the apparatus is erected and the shape of the actual wave form, the 35–40 foot height of the tops of the two enclosures above the average water level and the one-half wave length separation of the enclosures themselves must be maintained in order to ensure proper operation of the apparatus as described more fully below. Note also that the flexible diaphragm 38 extending across the horizontal cross section of the second enclosure 22 is preferably positioned at a height approximately that of the average water level 53.

Once in position, the first enclosure 20 is completely filled with sea water from the water body 50, and the interconnecting conduit 24 and the upper portion of the second enclosure 22 above the flexible diaphragm 38 are completely filled with fresh water. The lower portion of the second enclosure 22 below the flexible diaphragm is also filled with sea water from the water body 50. Any suitable means may be employed to introduce the sea and fresh water into the apparatus, the critical point being that the apparatus is completely filled. Note that once the two enclosures and the conduit are filled, the fresh water in the second enclosure 22 and the conduit 24 will be separated from the sea water in the first enclosure by the closed one-way valve 36, and from the sea water of the water body 50 by the diaphragm 38.

After a period of time, due to the negative pressure created within the apparatus by the weight of the water contained therein, water vapor will begin to form in the conduit 24 and near the tops of the two enclosures. This formation of water vapor will continue until the water has receded completely from the conduit 24 and the water levels 56 and 58 within the two enclosures have dropped to a height approximately 34 feet above the average surface 53 of the body of water 50, as shown in FIG. 1. This height is determined by the atmospheric pressure surrounding the apparatus and the fact that under standard conditions one atmosphere or 14.7 lbs/ft$^2$ will support a head of water of approximately 33.8 feet. The actual height of the water levels within the two enclosures will depend upon the purity and temperature of the sea water and upon the atmospheric pressure actually present. As the water level drops in the first enclosure 20, a portion of the water originally introduced into the enclosure is permitted to flow freely through the openings 34 near the bottom 30 of the enclosure. Similarly, the downward movement of the water contained within the second enclosure 22 will force the water below the diaphragm 38 out of the enclosure through the openings 34 near its bottom 32. This downward movement of the water within the second enclosure 22 will also force the diaphram 38 to deform downwardly. If the downward deformation of the diaphram 38 is sufficient to contact the limit switch 41 and activate the relief valve 40 a portion of the fresh water contained within the enclosure 22 will be discharged through the conduit 42.

Figure 3:
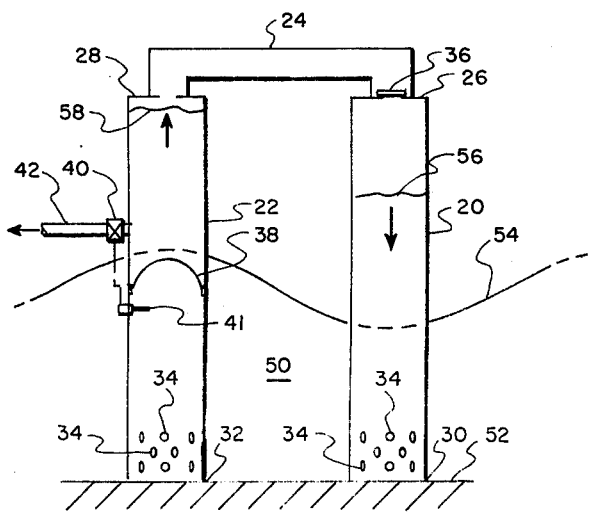
FIG. 3 is a simplified cross-sectional view of the pressure distillation system of FIG. 1 under the influence of the same undulating wave form displaced one-quarter wave length to the left.

Considering now the motion of the undulating hydraulic wave form 54, and assuming the wave form to be moving from the right to the left as viewed in the figures, the surrounding water surface will begin to drop near the first enclosure 20 and to rise near the second enclosure 22 until reaching their respective maximums as shown in FIG. 3. The lowering of the water level at the first enclosure 20 will draw the water column contained within the enclosure downwardly, increasing the vacuum within the enclosure and causing additional water vapor to form therein above the column. At the same time, the rising water level at the second enclosure 22 will force the water column contained within that enclosure upwardly, increasing the pressure within both the enclosure and the interconnecting conduit 24. This increased pressure will cause the water vapor within the second enclosure 22 and the conduit 24 to begin to condense and run down the sides of the enclosure and conduit, adding to the quantity of fresh water contained within the enclosure. During this period, because of the vacuum generated within a first enclosure 20 and the pressure generated within the conduit 24, the pressure sensitive valve 36 will remain closed preventing the water vapor contained within the conduit from entering the first enclosure.

Figure 2:
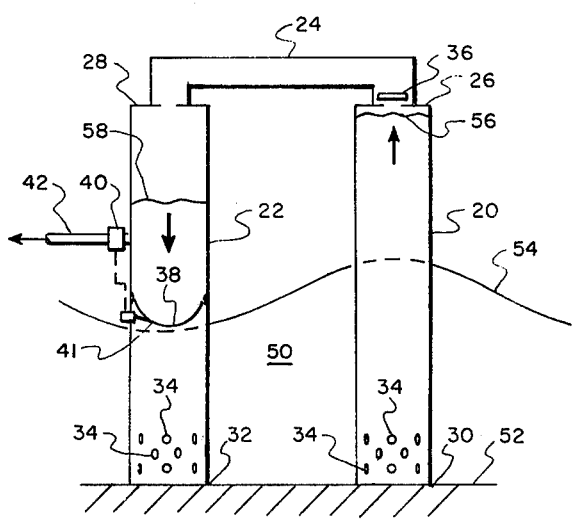
FIg. 2 is a simplified cross-sectional view of the pressure distillation system of FIG. 1 under the influence of the same undulating hydraulic wave displaced three-quarter wave length to the left.

As the movement of the undulating wave form 54 continues to the left, the water level at the first enclosure 20 will begin to rise and the water level at the second enclosure 22 will begin to drop until reaching the levels indicated in FIG. 2. The rising water level at the first enclosure 20 will cause the water contained therein to rise, thereby increasing the pressure within the enclosure, to a value sufficient to cause the pressure-sensitive valve 36 to open, and forcing the water vapor formed during the previous period of low water level out of the enclosure and into the conduit 24. At the same time, the lowering water level at the second enclosure 22 will draw the water contained within the enclosure and the conduit 24 to facilitate the receipt thereinto of the water vapor being expelled from the first enclosure. In this manner, the continuous undulation of surrounding water levels caused by the movement of the hydraulic wave form 54 defining the surface of the water body 50 will alternately convert a portion of the water contained within the first enclosure 20 into a water vapor, force that water vapor into the conduit 24 and the second enclosure 22, and that convert a portion of that water vapor into fresh water within the second enclosure.

As the quantity of fresh water contained within the second enclosure accumulates by the continued receipt and condensation of the water vapor formed in the first enclosure, the flexible diaphragm 38 extending across the horizontal cross section of the enclosure will be drawn increasingly downwardly until it contacts the limit switch 41 and activates the relief valve 40 to discharge a portion of the fresh water from the enclosure and into the discharge conduit 42 for subsequent use. The quantity of water removed from the first enclosure 20 as water vapor is automatically replenished during each cycle of the undulating wave form by the free passage of sea water into the enclosure through the openings 34 formed near its bottom, thereby automatically maintaining the quantity of water within the enclosure at a constant predetermined amount. Thus, once in place and filled with the appropriate quantities of fresh water and sea water, the pressure distillation apparatus of the present invention will continue to operate indefinitely, requiring as an energy source only the undulating movement of the surrounding water surface.

After a sustained period of continuous operation, the heat absorbed during vaporization and the heat produced during condensation will tend to cause the temperature of the sea water in the first enclosure 20 to drop and the temperature of the fresh water in the second enclosure 22 to rise. If permitted to continue, these temperature changes will reduce the overall efficiency of the system. Therefore, it is preferable to position two or more pressure distillation systems in heat-transferring juxtaposition with their respective first and second enclosures reversed, that is, with the first enclosure of one system proximate the second enclosure of another system and vice versa. In this manner, the heat produced during condensation of the water vapor in each system may be dissipated fully to replace the heat lost during vaporization of the sea water. Further, it may be necessary to periodically purge the system of any dissolved air released from the sea water during the vaporation cycle. If the air is permitted to remain in the system with the water vapor it will also affect the operating efficiency. Its removal from the system may be accomplished by any conventional means.

Figure 4:
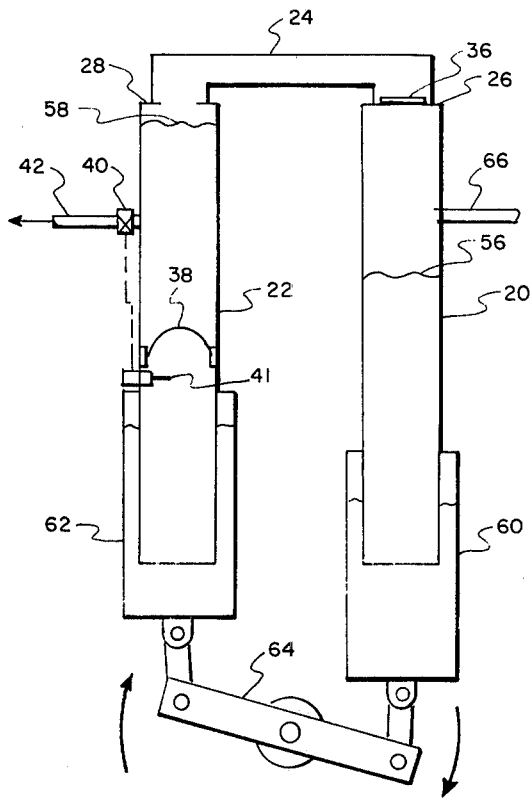
FIG. 4 is a simplified cross-sectional view of an alternate embodiment of the pressure distillation system of the present invention.

A second embodiment of the pressure distillation apparatus of the present invention is shown in FIG. 4. This second embodiment is similar in most respects to the first embodiment described above with the principal exception being that the pressure variations necessary to produce the requisite vaporization and condensation are produced by raising and lowering two tanks 60 and 62 of water or other liquid surrounding the bottoms 30' and 32', respectively, of the two enclosures 20' and 22'. The sequential and alternate raising and lowering of these two tanks simulates the undulating motion of the wave form previously discussed and produces a similar operation of the apparatus. Any suitable means may be employed to alternately and sequentially raise and lower the two tanks 60 and 62 or otherwise produce the necessary pressure variations. One such means is disclosed in FIG. 4 as comprising a lever arm 64 intercoupling the bottoms of the two tanks and oscillatable about a point through its center by any conventional means. Since in this embodiment, the first enclosure 20 is no longer in communication with an inexhaustible supply of impure liquid, an inlet conduit 66 is attached to the enclosure to permit the periodic replenishment of the liquid lost during vaporization.

Although the pressure distillation system of the present invention has been described in the context of a water purification or desalination system, it is readily apparent that the apparatus and method disclosed may be used as well to purify other liquids. For example, by positioning a second flexible diaphragm 70 across the horizontal cross section of the first enclosure 20 as shown in FIG. 1 and attaching an inlet conduit 72, an undulating wave form present at the surface of an open body of water may be utilized to purify liquid other than the water of the body itself.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:
1. An apparatus for purifying a liquid by pressure distillation comprising:
   first and second upright walled enclosures;
   conduit means sealingly interconnecting said first and second enclosures for permitting vapor flow therebetween;
   c. pressure-sensitive one-way valve means associated with said conduit means for permitting vapor flow through said conduit means from said first enclosure to said second enclosure whenever the pressure is greater in said first enclosure than in said second enclosure, and for preventing vapor flow in the opposite direction;
   d. inlet means associated with said first enclosure for permitting the introduction of a liquid thereinto;
   e. means for simultaneously and alternately varying the pressure within said first and second enclosures in mutually opposite directions above and below a predetermined value such that, when said pressure within said first enclosure is above said predetermined value and said pressure within said second enclosure is below said predetermined value, said valve means is open to permit any vapor contained within said first enclosure to flow therefrom and into said second enclosure, and when said pressure within said first enclosure is below said predetermined value and said pressure within said second enclosure is above said predetermined value, said valve means is closed, said decreased pressure in said first enclosure being sufficient to cause a portion of any liquid contained therein to evaporate into a vapor, and said increased pressure in said second enclosure being sufficient to cause a portion of any vapor contained therein to condense into a liquid;
   f. a flexible diaphragm mounted in said second enclosure so as to extend laterally thereacross for restraining the downward movement of said condensed liquid; and
   g. automatic discharge means associated with said second enclosure and responsive to an accumulated quantity of said condensed liquid therein above said diaphragm for permitting the discharge of said condensed liquid whenever said quantity reaches a predetermined level.

2. The liquid purifying apparatus of claim 1 wherein said means for simultaneously and alternately varying the pressure within said first and second enclosure means comprises means for raising and lowering a quantity of liquid partially filling each said enclosure means solely in response to the undulating motion of the surface of an open body of wave-active water.

3. The liquid purifying apparatus of claim 1 wherein said first and second enclosures are partially immersed in a common body of liquid, the surface of which defines an undulating wave form, said first and second enclosures having a plurality of openings formed in their walls proximate their bottoms to permit the free flow of liquid therethrough, said flexible diaphragm extending laterally across said second enclosure serving to seal the upper interior portion of said second enclosure from said body of liquid, and wherein said means for simultaneously and alternately varying the pressure within said first and second enclosures in mutually opposite directions comprises means for holding said first and second enclosures immovable and spaced laterally from one another a distance approximately equal to one-half wave length of said undulating wave form such that undulations of said surface of said body of liquid causes a quantity of liquid contained within each said first and second enclosure to rise and fall in alternate order, thereby alternately increasing the pressure within one of said enclosures while simultaneously decreasing the pressure within the other of said enclosures.

4. The liquid purifying apparatus of claim 3 wherein said flexible diaphragm is deformable upwardly and downwardly by the undulating movement of the surface of said body of liquid, and wherein said discharge means is responsive to the downward deformation of said flexible diaphragm so as to permit the discharge of a quantity of liquid from said second enclosure when the downward deformation of said diaphragm reaches a predetermined limit.

5. The liquid purifying apparatus of claim 1 further comprising means for maintaining a quantity of liquid contained within said first enclosure at a predetermined constant amount.

6. The liquid purifying apparatus of claim 1 wherein said first and second enclosures each have open bottoms, and wherein said means for simultaneously and alternately varying the pressure within said first and second enclosures in mutually opposite directions comprises liquid-filled tank means surrounding the open bottom of each enclosure means and means for simultaneously and alternately raising and lowering each such tank means in mutually opposite directions about a respective said enclosure.

7. An apparatus for purifying water by pressure distillation comprising:
a. first and second upright enclosures adapted to rest on the bed of an open body of water, the surface of said water defining an undulating wave form, each said disclosure being of sufficient height to rise at least 35 feet above the average level of said water, said enclosures being separated from one another in the direction of said undulating wave form by a distance approximately equal to one-half the wave length of said wave form;
b. means associated with each said enclosure for permitting the free ingress and egress of said water thereinto and therefrom;
c. conduit means sealingly interconnecting the uppermost portions of said first and second enclosures for permitting vapor flow therebetween;
d. pressure-sensitive one-way valve means associated with said conduit means for permitting vapor flow therethrough in a direction from said first enclosure to said second enclosure whenever the pressure within said first enclosure is greater than that within said second enclosure, and for preventing vapor flow in the opposite direction;
e. a flexible diaphragm mounted in said second enclosure so as to extend laterally thereacross for preventing a liquid present in said second enclosure above said diaphragm from contacting said water present below said diaphragm; and
f. automatic discharge means associated with said second enclosure and responsive to an accumulated quantity of liquid therein above said diaphragm for permitting the discharge of said liquid whenever said quantity reaches a predetermined level, whereby, when said first and second enclosures are positioned in said open body of water as described, said undulating wave form simultaneously and alternately causes water to enter and leave said enclosures through said ingress and egress means and thereby causes the pressure within said enclosures to vary simultaneously and alternately in mutually opposite directions above and below a predetermined value, said decreased pressure within said first enclosure being sufficient to cause a portion of said water present therein to be transformed into water vapor and said increased pressure within said first enclosure being sufficient to force said vapor past said valve means and into said second enclosure via said conduit means, and said decreased pressure in said second enclosure being sufficient to permit the transfer thereinto of said vapor from said first enclosure and said increased pressure in said second enclosure being sufficient to cause said vapor to be recondensed into water, said recondensed water accumulating above said diaphragm until discharged from said enclosure via said discharge means.

8. The apparatus of claim 7 wherein said flexible diaphragm is positioned at a level approximately equal to the average level of said open body of water.

* * * * *

UNITED STATES PATENT AND TRADEMARK OFFICE
CERTIFICATE OF CORRECTION

PATENT NO. : 4,035,241
DATED : July 12, 1977
INVENTOR(S) : Vincent E. Carman

It is certified that error appears in the above-identified patent and that said Letters Patent are hereby corrected as shown below:

| | | |
|---|---|---|
| Col. 1, | Line 27 | After "to" add the word --an--. |
| Col. 4, | Line 28 | Change "FIg." to --FIG.--. |
| Col. 5, | Line 9 | Change "oven" to --over--. |
| Col. 5, | Line 33 | Change "approximately" to --approximating--. |
| Col. 6, | Line 60 | Change "that" to --then--. |
| Col. 8, | Line 17 | Insert "a." before "first"--. |
| Col. 8, | Line 18 | Insert "b." before "conduit"--. |
| Col. 9, | Line 50 | Change "disclosure" to --enclosure--. |

Signed and Sealed this

Twenty-fourth Day of January 1978

[SEAL]

Attest:

RUTH C. MASON
Attesting Officer

LUTRELLE F. PARKER
Acting Commissioner of Patents and Trademarks